United States Patent
Grohova

(10) Patent No.: US 9,909,769 B2
(45) Date of Patent: Mar. 6, 2018

(54) AIR SUCTION WALL FOR EQUIPPING INDUSTRIAL WORKING AREAS, SUCH AS WELDING AREAS

(71) Applicant: HPM Engineering S.r.l., Cassolnovo (PV) (IT)

(72) Inventor: Marcela Grohova, Barberino di Mugello (IT)

(73) Assignee: HPM ENGINEERING S.R.L., Cassolnovo (PV) (IT)

( * ) Notice: Subject to any disclaimer, the term of this patent is extended or adjusted under 35 U.S.C. 154(b) by 59 days.

(21) Appl. No.: 15/021,325

(22) PCT Filed: Sep. 9, 2014

(86) PCT No.: PCT/IB2014/064344
§ 371 (c)(1),
(2) Date: Mar. 11, 2016

(87) PCT Pub. No.: WO2015/036916
PCT Pub. Date: Mar. 19, 2015

(65) Prior Publication Data
US 2016/0223213 A1    Aug. 4, 2016

(30) Foreign Application Priority Data

Sep. 16, 2013 (IT) .............................. FI20130042 U

(51) Int. Cl.
*B01L 1/04* (2006.01)
*B08B 15/02* (2006.01)
(Continued)

(52) U.S. Cl.
CPC ............ *F24F 7/007* (2013.01); *B01D 46/002* (2013.01); *B01D 46/0023* (2013.01);
(Continued)

(58) Field of Classification Search
CPC ......... B01L 1/04; B08B 15/02; B08B 15/026; B08B 15/023; B08B 2215/003;
(Continued)

(56) References Cited

U.S. PATENT DOCUMENTS

| 5,264,015 A | 11/1993 | Matsui |
| 2011/0034119 A1 | 2/2011 | Mase et al. |
| 2013/0061567 A1* | 3/2013 | Kawasaki ................ B01L 1/04 55/385.2 |

FOREIGN PATENT DOCUMENTS

WO    2010098842 A2    9/2010

OTHER PUBLICATIONS

International Search Report for International Application No. PCT/IB2014/064344.(dated Jan. 7, 2015)(2 pages).

* cited by examiner

Primary Examiner — Frank Lawrence, Jr.
Assistant Examiner — Minh-Chau Pham
(74) Attorney, Agent, or Firm — Lucas & Mercanti, LLP

(57) ABSTRACT

A suction wall with properties of suction and differentiated filtration of different types of pollutant is provided which is useful for industrial working areas. The suction wall includes a box-like frame, an inner compartment, a suction device for drawing in air, a first air inlet, a filtering device, and a second air inlet. The inner compartment is located between a rear panel and a front permeable diaphragm of the box-like frame, and also includes partitions in the compartment. The filtering device includes at least two filtering units.

13 Claims, 8 Drawing Sheets

(51) Int. Cl.
*B01D 46/00* (2006.01)
*B01D 46/12* (2006.01)
*F24F 7/007* (2006.01)
*B08B 15/00* (2006.01)
*F24F 13/08* (2006.01)
*F24F 13/20* (2006.01)
*F24F 13/28* (2006.01)

(52) U.S. Cl.
CPC .......... *B01D 46/0041* (2013.01); *B08B 15/00* (2013.01); *F24F 13/082* (2013.01); *F24F 13/20* (2013.01); *F24F 13/28* (2013.01)

(58) Field of Classification Search
CPC ................ B01D 46/00; B01D 46/0091; B01D 46/0098; B01D 46/12; F24F 3/1607; Y10S 55/18
USPC .......................................... 55/385.2; 454/187
See application file for complete search history.

AIR SUCTION WALL FOR EQUIPPING INDUSTRIAL WORKING AREAS, SUCH AS WELDING AREAS

CROSS-REFERENCE TO RELATED APPLICATIONS

This application is a 371 of PCT/IB2014/064344, filed Sep. 9, 2014, which claims the benefit of Italian Patent Application No. FI2013U000042, filed Sep. 16, 2013.

TECHNICAL FIELD OF THE INVENTION

The present invention refers in general to the field of suction systems for industrial processing like, for example, but not exclusively welding processing.

BACKGROUND OF THE INVENTION

According to the prior art, so-called suction walls consist of a wall-type structure, a large surface of which is equipped with suction power, to suck in and filter the aeriform pollutants that develop through the effect of a certain processing carried out near to the wall itself. Compared to more complex structures such as actual rigid cabins, suctions walls offer more flexibility of use, in particular thanks to particularly advantageous embodiments that make transportability possible by fork lift trucks, and that may be equipped with extensible tunnels that, projecting from the wall, circumscribe and physically isolate the area of processing on the sides and on top, decreasing dispersions of pollutant and increasing the efficiency of the suction. Suction walls moreover ensure substantially better results than simple suction tubes or arms.

SUMMARY OF THE INVENTION

With the present invention a new configuration of suction wall is now provided thanks to which it is possible to achieve even greater efficiency of suction and filtration, in particular for situations in which different types of pollutant are released by the same processing (or else from two workings carried out at the same time), without however increasing the complexity, the weight and the bulk of the structure, but rather with a solution that is particularly simple, easy to transport and set up, as well as being cost-effective.

Such a result is accomplished by the suction wall for industrial working such as in particular, but not exclusively, welding according to the present invention.

BRIEF DESCRIPTION OF THE DRAWINGS

The invention will now be illustrated in greater detail with the following description of embodiments thereof, given as non-limiting examples with reference to the attached drawings, in which.

DETAILED DESCRIPTION OF THE INVENTION

Figure 1:
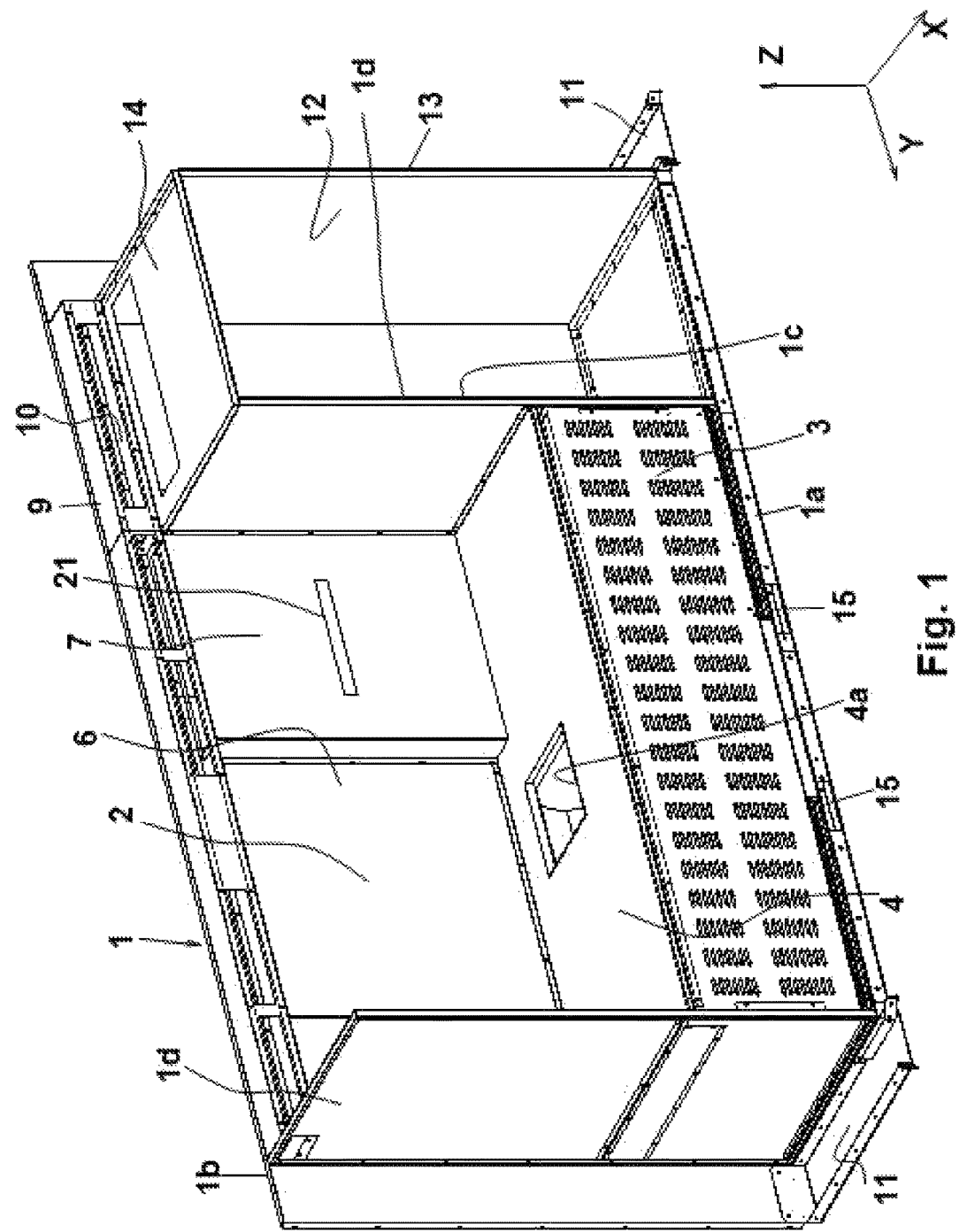
FIG. 1 is an axonometric view of a suction wall according to a first embodiment of the invention.
Figure 2:
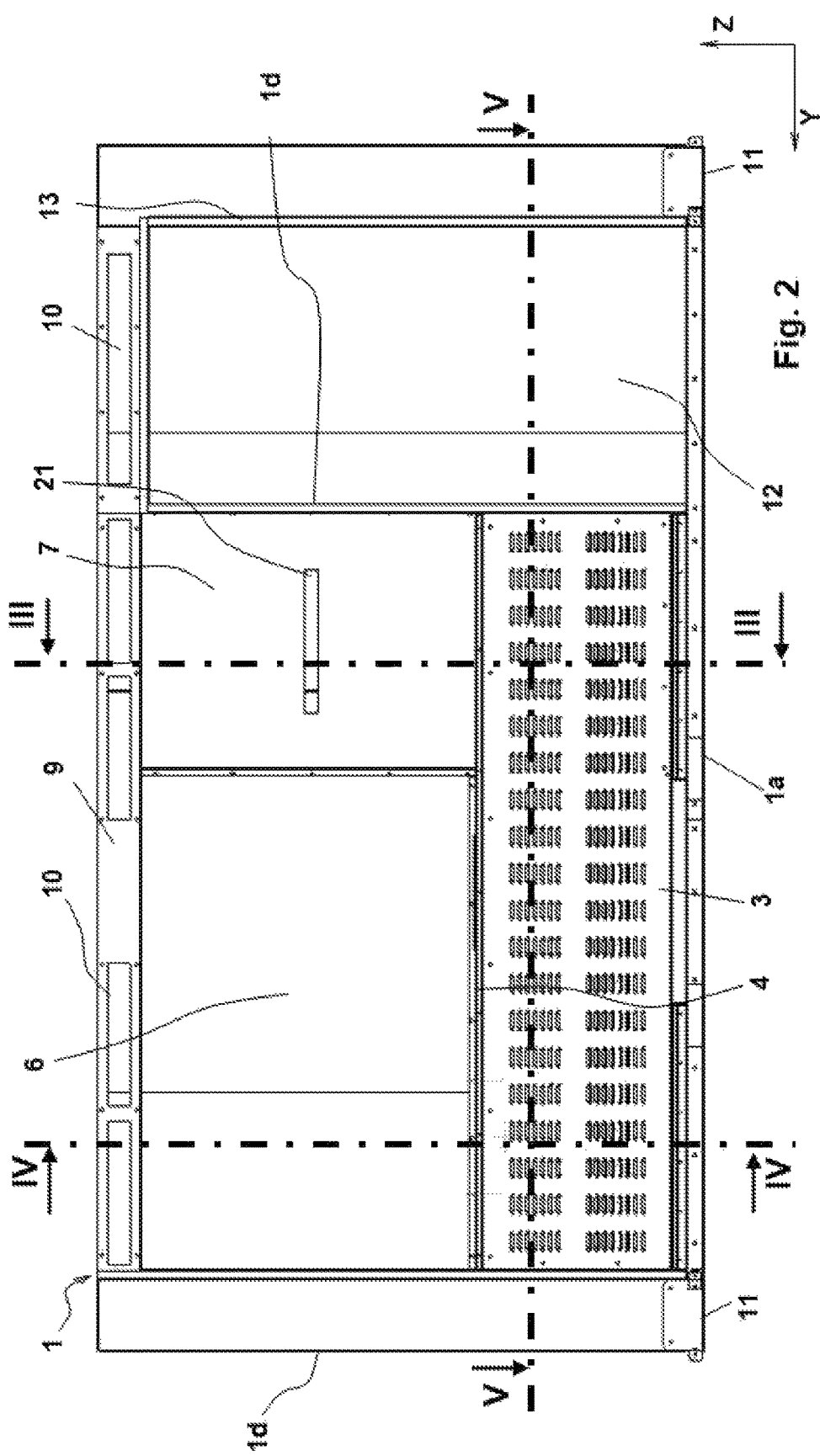
FIG. 2 is a front view of the wall of FIG. 1.
Figure 4:
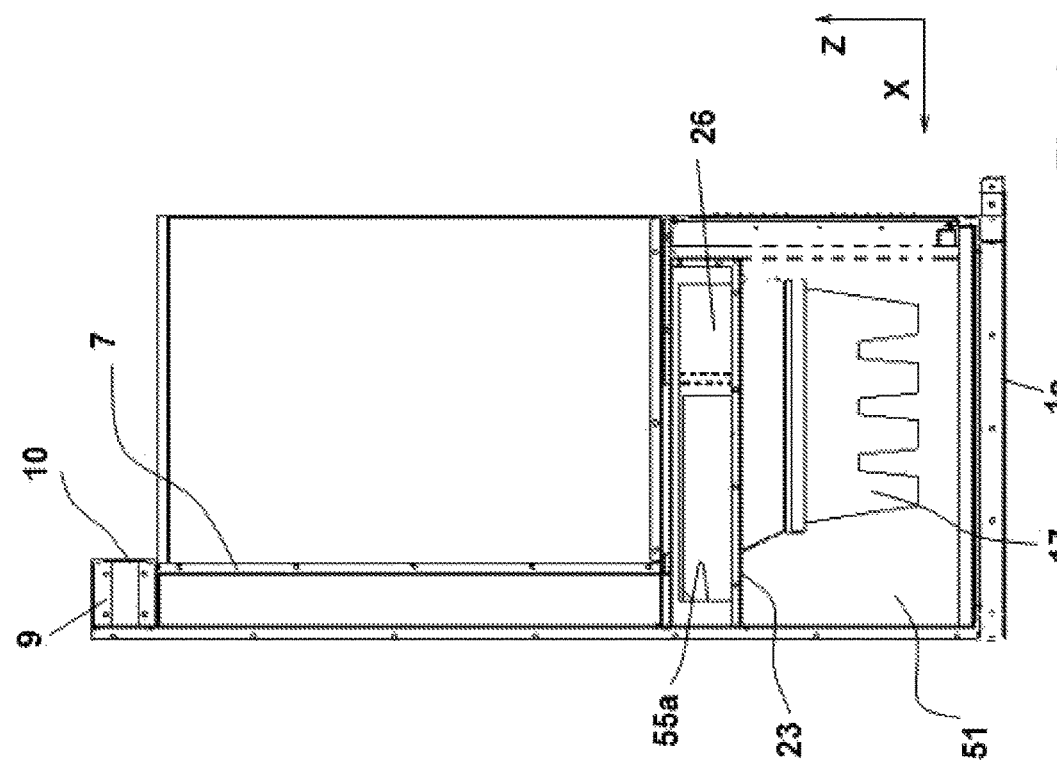
FIGS. 3, 4 and 5 are schematic section/cut-away views, carried out substantially at the height, respectively, of the planes indicated by the arrows III-III, IV-IV and V-V of FIG. 2.
Figure 3:
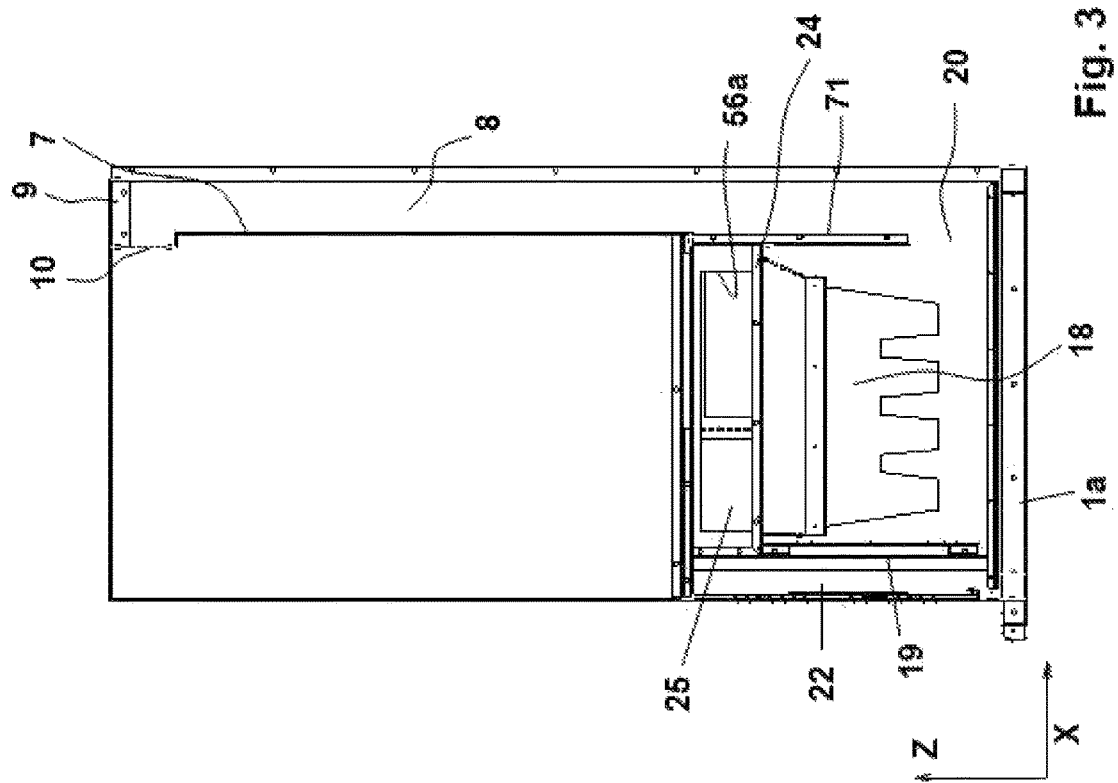

With reference to figures from 1 to 8, the suction wall according to the invention comprises, in a typical solution, a frame 1 of parallelepiped shape that rises up from a base 1a intended for resting on the ground. The wall therefore extends in height according to a direction Z, whereas a plane XY, to complete a Cartesian coordinate system, is that on which the base 1a extends and that substantially corresponds to the plane of the ground in the use configuration. The dimensions in plan are substantially greater along the direction Y with respect to the direction X; the first is the width dimension, which defines two main faces (by extension) 1b, 1c of the parallelepiped, whereas the second is the depth dimension and defines two side flanks 1d of the wall. The main faces are respectively defined by a rear panel 2, with continuous extension, and by a grating 3 or other similar system using a permeable and pre-filtering diaphragm through which a substantial part of the suction effect is carried out.

The front face 1c is therefore the one intended to face the work area, with the grating 3 that extends from the base 1a up to a certain height. The grating 3 indeed, together with a dividing partition 4 parallel and spaced with respect to the base 1a, with the base itself and with the lower part of the rear panel 2, encloses an inner compartment 5 which will be discussed hereafter. Above the dividing partition 4 the front face is interrupted and the wall, in cooperation with the side flanks 1d, defines a recess 6 opened towards the work area.

The recess 6 is closed at the back by the rear panel 2 but on a portion adjacent to one of the flanks 1d there is a partition 7 that in turn rises up over a plane YX, parallel with and spaced from the panel 2 so as to form a gap 8 communicating with the inner compartment 5 adjacent to the base. The partition 7 has, for example up to roughly half of its height, at least one suction opening 72 and it communicates on top with the outside through further suction mouths 10, again facing towards the work area and defined by a framework 9 that extends along the entire upper edge of the panel projecting at the front.

Figure 8:
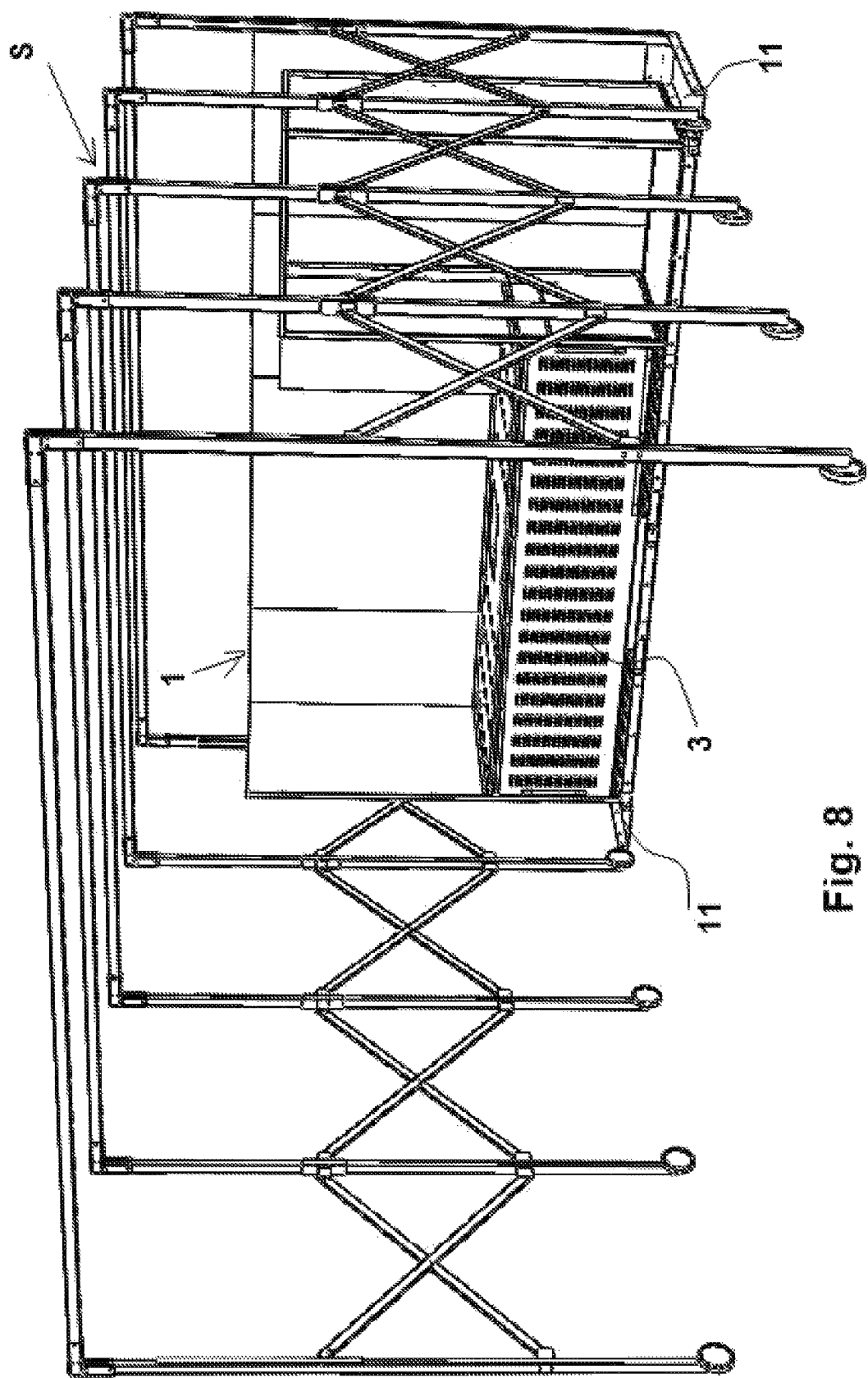
FIG. 8 is an axonometric view of the wall together with an extractable tunnel structure that represents an accessory thereof.

Outside of the flanks 1d, like in the illustrated variants, respective platforms 11 are advantageously provided on which to rest support wheels of an extensible tunnel (bellows-type) structure S intended to enclose the work area on the sides and on top, and represented in FIG. 8 in terms of its skeleton. Between a flank and the relative platform 11 there can also be a chamber 12, possibly occupied by shelves like in the example/variant of FIG. 6, for housing and storing in an organised manner, making them transportable together with the wall, apparatuses, tools and/or processing accessories of a kind obviously depending on the type of processing taking place. The chamber 12 is in practice defined by a flank 1d and by a side diaphragm 13 parallel with and spaced from the flank, as well as by a cover 14. Of course, in this case the rear panel extends in the direction Y to also shut the chamber 12 (as well as the area of the platforms 11 if present).

The base 1a preferably has a plate-shaped box-like structure, so as to make passages 15 available for the insertion of lifting forks of fork-lifts. This makes the wall, possibly provided with the tunnel in compacted configuration supported by the platforms 11, easy to transport from one area to another of the work space, with obvious advantages in terms of logistical flexibility. The base can also be equipped with wheels. Moreover, immediately above the base 1a there can be drawers for collecting and recovering dust or processing waste from the inner compartment 5.

Figure 5:
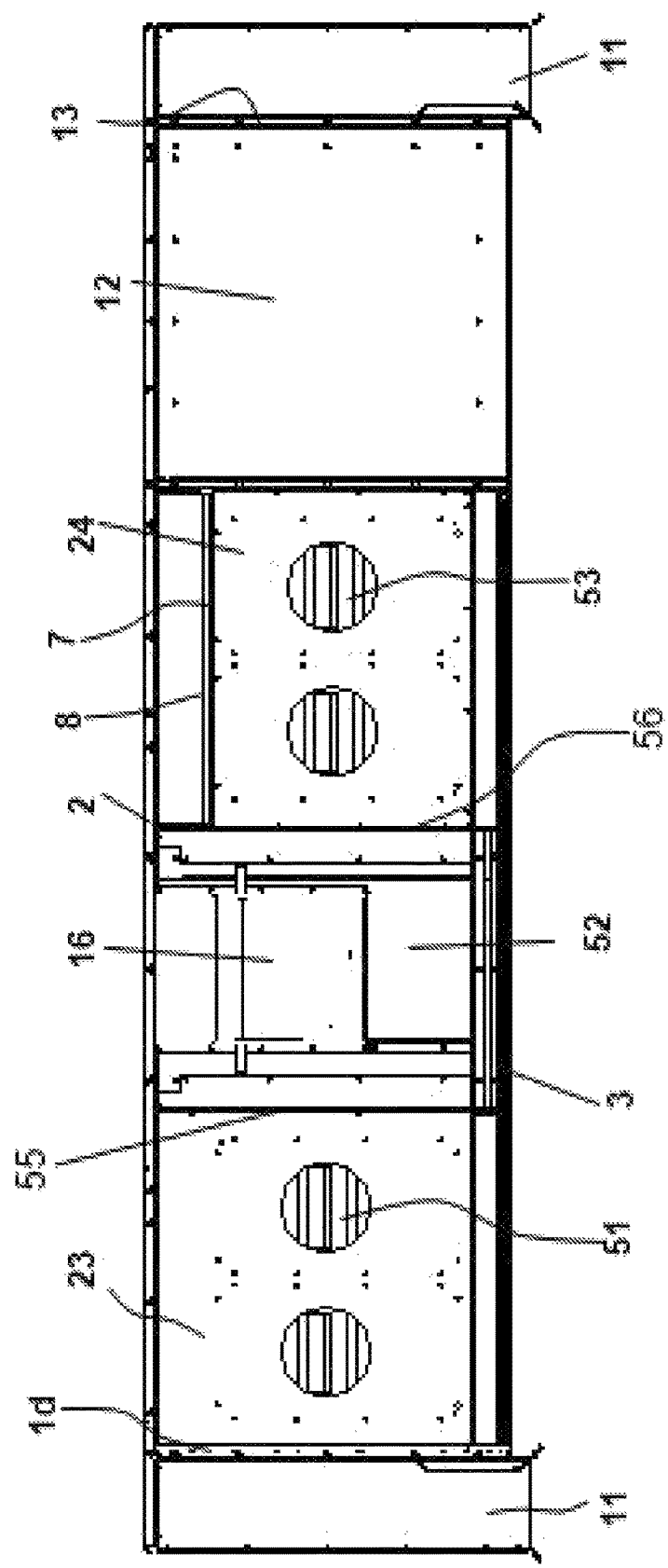
Figure 6:
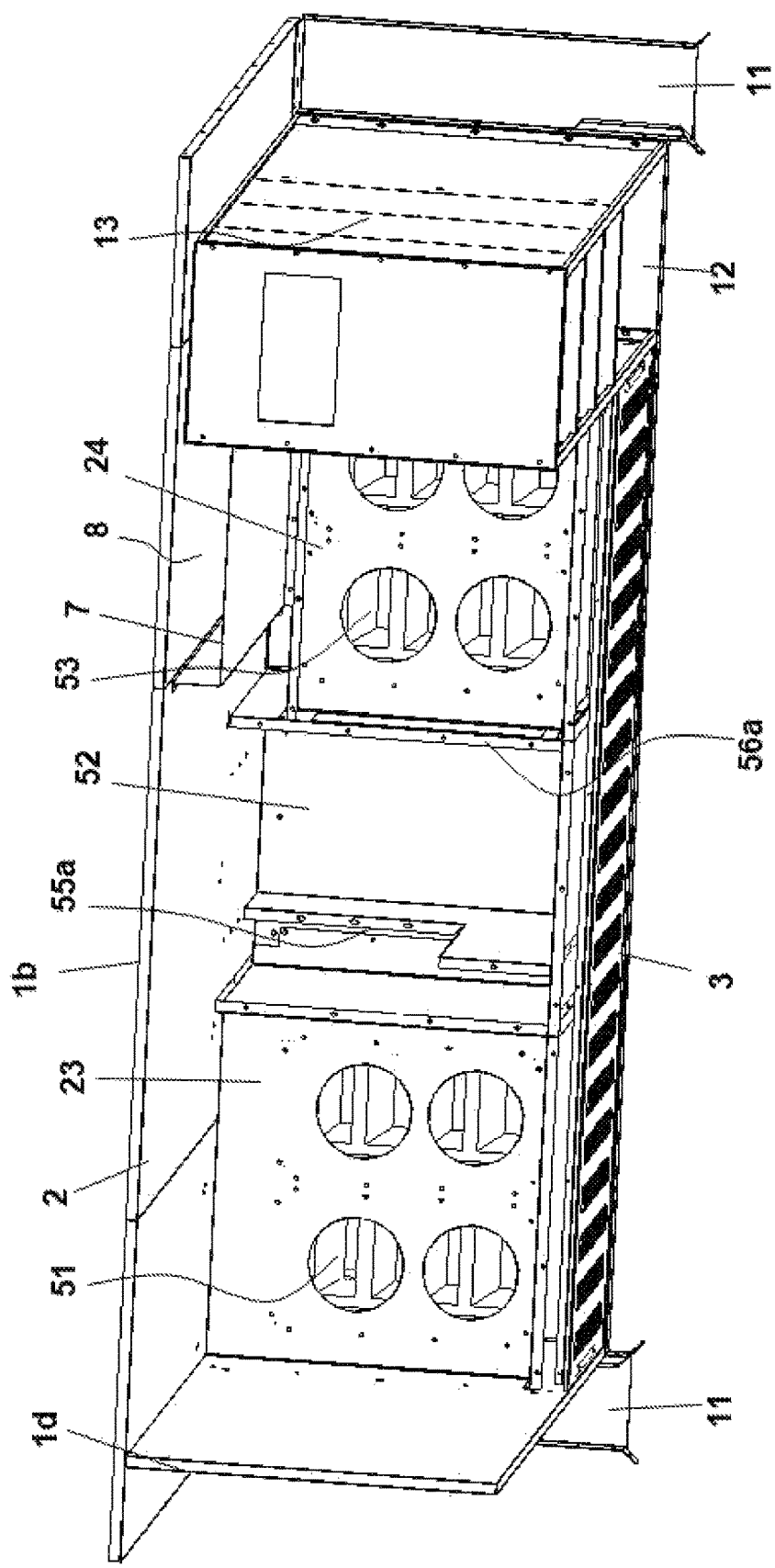
FIG. 6 is a view from above of the wall, with an axonometric point of view and parts omitted/broken for the sake of clarity of illustration, in a variant embodiment with respect to that of the previous figures.

With reference in particular to FIGS. 5 and 6, returning to the inner compartment 5 at the base of the wall, which represents the core of the novel configuration here disclosed, it is divided into three adjacent and consecutive sectors, following the direction Y, indicated at 51, 52, 53, as a result of the provision of inner transversal septa (lying on planes XZ) indicated at 55, 56. The central sector 52 is occupied by suction means 16 (a fan, many fans associated with one another, a simple connection to an external fan) whereas the two end sectors 51, 53 are occupied by respective filtering means 17, 18, of a type that can vary for different types of pollutant. In a more typical embodiment the filters will for example be dedicated on one side to heavy dusts, and on the other side to light or in any case aeriform pollutants. Such a mutually different nature has a relationship with the pneumatic communication that involves such two end sectors and that makes them suitable for collecting, on the one side, a suction flow from the area close to the ground, and on the other side a suction flow coming from the area at the top of the suction wall.

Figure 7:
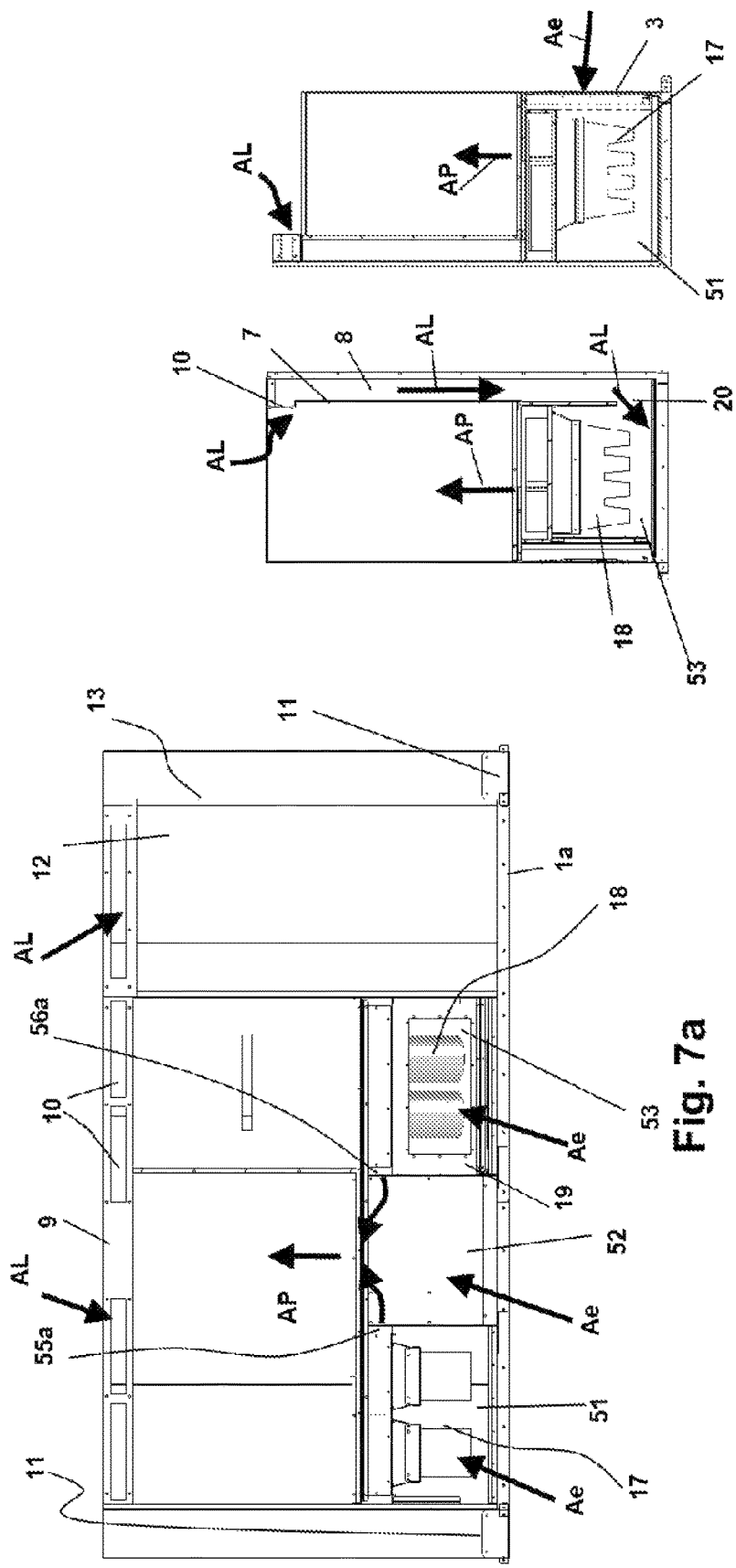
FIGS. 7a, 7b, 7c substantially correspond to FIGS. 2, 3 and 4 in order to provide a functional representation of the pneumatic flows in the wall.

Regarding this, the central sector 52 communicates with the recess 6 through an opening 4a formed for example on the dividing partition 4 (or in the rear panel 2) and through such an opening purified air Ap (see FIG. 7a) is discharged to the outside, after having been collected and conveyed by channels, not represented, which avoid direct exit in the recess. The same sector communicates through openings 55a, 56a formed on the dividing septa 55, 56 with the side sectors to obtain air therefrom that has undergone the action of the filtering means (again arrows Ap in FIG. 7a). More precisely, such openings are advantageously formed in a region close to the upper horizontal partition 4.

No other pneumatic communication involves the central sector, which is closed on the front side (adjacent to the grating 3) by a vertical bulkhead 19 (plane YZ) which shuts the openings of the grating not only in the area of the aforementioned central sector 52 but also in that of a side sector 53 housing the filters for the "light" pollutants; this is precisely the side sector that which is found in correspondence to the partition 7 and gap 8. Such a side sector 53 closed at the front by the bulkhead 19 is open towards the gap 8 by means of a passage 20 that is formed at a bottom region, between the base 1a and a lower end side of the partition 7 (or more specifically of an extension 71 thereof that extends beyond the upper horizontal partition 4). Therefore, the flows of "light" pollutants, such as welding smoke that tends to rise (micro-particles of dust and aeriforms at high temperature), indicated with AL by the arrows of FIG. 7b, collected by the suction mouths 10 of the upper framework 9, as well as by possible other windows on the partition 7 like the one indicated with 21 in the figures, are drawn into the side sector below 53, to be filtered by its appropriate filtering means.

Considering now the other side sector 51, it is open on the front side (not shut by the bulkhead 19) through which the "heavy" pollutants that tend to stay close to the ground (such as grinding powders symbolized by the arrows Ae), are captured. It can also be seen that such catching involves the entire surface of the grating 3, since it is slightly distanced from the bulkhead 19, and the space delimited and closed at the rear between such components, indicated with 22, is in any case placed in depression as a result of the suction induced in the sector 51. Also in this case the filtered air is drawn by the suction means as mentioned through the passage 56a of the vertical septum 56. Regarding this, it should be noted how in both of the side sectors the filters are supported by attachment plates 23, 24 that are spaced from the horizontal partition 4, so that the filtered air is collected in spaces 25, 26 at which the passages 55a, 56a open.

Thanks to this particular configuration, two very different types of pollutant (or rather air loaded with pollutants of different weight and/or different temperature) can be treated, purifying the flows with surprising efficiency and with a single ventilation propulsion system, thus achieving substantial advantages in terms of compactness and cost-effectiveness of operation (also in terms of energy consumption) also with a filtering action that is optimised for each specific pollutant deriving from the processing carried out. For example and in particular in welding processing the two types of pollutants are not only the result of the welding working in itself but also, as already mentioned, of the grinding processes related with the welding and that produce the heavier waste materials. Such different operations must normally be carried out in the same work area, which obviously does not impede, but rather takes advantage of the capabilities of the wall described above.

The effective suction of 100% of the pollutant is ensured from the work area, keeping the rest of the environment perfectly clean, with a faster exchange of air allowing the air itself to choose the preferential path and a suitable filtration for each path. The differentiated filtration ensures that each filtering means is optimised for the type of flow being treated, so that the filters work in an optimal manner, have a longer lifetime, avoiding malfunctions, blockages or breakages and ensuring the possibility of correct disposal or where possible reuse (with favourable environmental impact).

Similar considerations apply for other processing in many steps like for example preparation for painting, which makes it useful to have differentiated suction and filtration of dust and of residues/emissions of the application of primers and/or undercoats to the actual painting. Also in this case a wall configured according to the invention ensures an optimal result with a homogeneous flow and at constant speed, without shaded areas and/or vortices, and of course with the structural simplicity already highlighted.

Moreover, the novel configuration that represents the core of the wall, i.e. the internal configuration of the base compartment 5, can be used, except for minimal adaptations, for variants that are different overall and intended for the treatment of pollutants coming from different processing.

Figure 9:
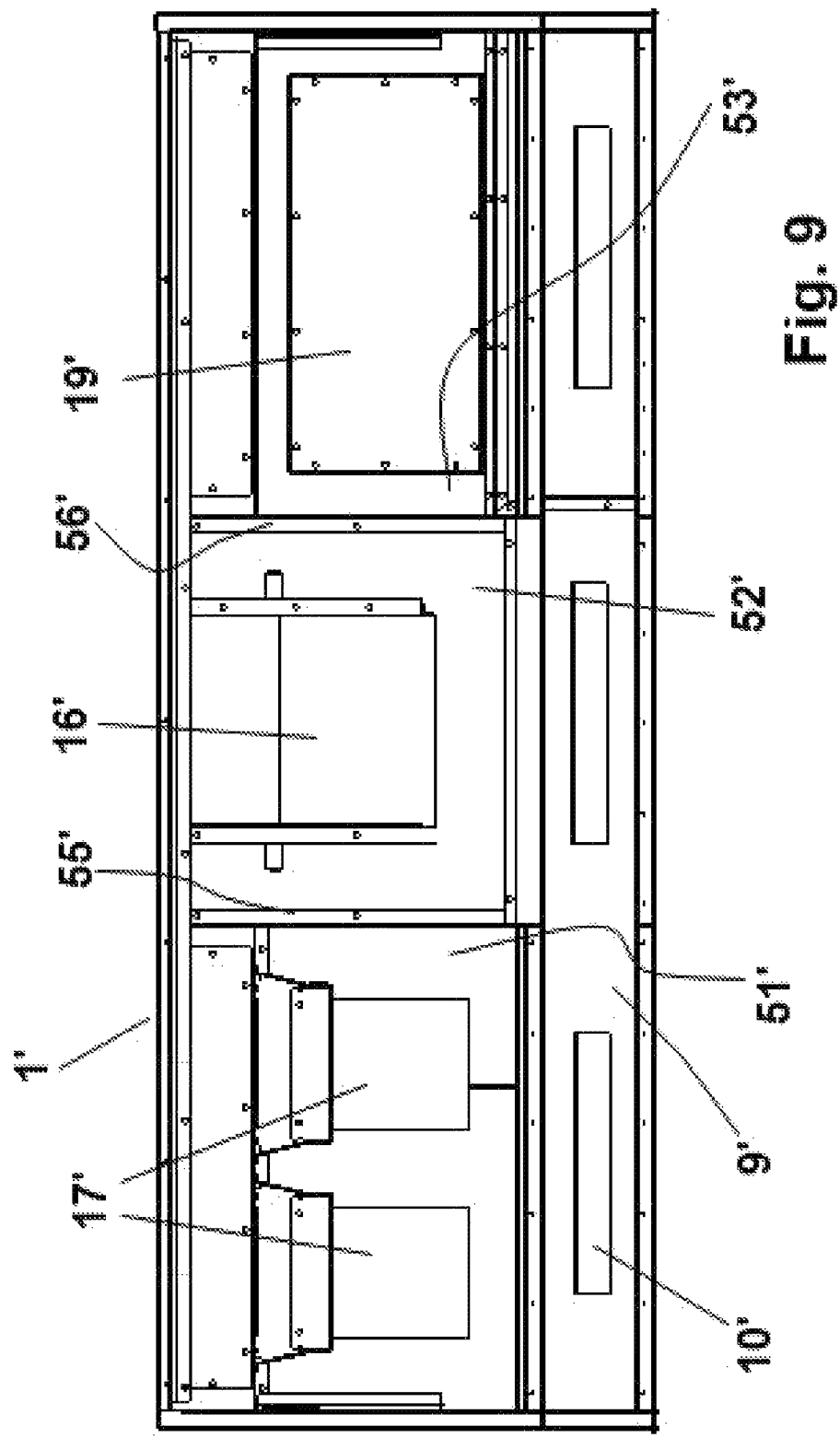
FIG. 9 is a front section view (without a front grating), of a different embodiment of the wall according to the invention.

Regarding this, considering now the example of FIG. 9, in which a simple bench structure indeed has a part that again proposes (as denoted by reference numerals corresponding to those used above) the configuration already described, with the exception that the entire upper recessed part is no longer present, and a second suction channel is made available in addition to that determined by the grating, not above but below the same grating. This system can be used to optimise the suction flows for processing operations that result in pollutants that are both substantially "heavy" but still have a different tendency to rise in the air. Moreover, according to the same principle it is possible to foresee solutions capable of catching flows even at three or more different heights.

The complexity and logistical difficulties of known systems with suction arms, mobile aspirators with arm and/or flexible tube are avoided, still with a transportable structure that can be more easily managed with respect to a rigid cabin.

The internal compartmentisation of the wall is obtained with materials (panels, dividing walls, diaphragms) commonly available on the market, and therefore with low production costs. The accessory extensible structure to make a processing tunnel is clearly an extremely useful addition, reducing the volume of the air to be purified and managing to provide the work area with a healthy exchange of air, and it can foresee the use of a sheet of plastic material that, although transparent for the passage of light, has optical filtering properties that protects the eyes of passers-by welding sparks, still making it possible to inspect the work area from the outside safely.

Further bulkheads can be provided, possibly equipped with flow throttling shutters so as to exploit as much as possible the set flow rate (for a certain and low energy consumption) on a single preferred channel based on the type of working. In practice, the two suction/filtering channels can thus work separately. For example, during the grinding step it is possible to deactivate the "high" channel, obstructing the passage 55a with a mobile bulkhead to maximise the efficiency of the low channel and the passage through the filtering means dedicated to dust. Vice-versa, the passage 56a can be blocked in the case only a suction of welding smoke is required, so that the suction is carried out only at the high channel with consequent exclusive passage through the filtering means for the smoke particles.

One of the sectors of the compartment 5, for example the sector 51 that is used for the suction of the heaviest pollutants, can advantageously be equipped with specific filters for dust also with an automatic cleaning system, compatibly with the constraints of the space available according to the installation circumstances.

The channel (or channels) for the passage of the flow in the additional catching means, with respect to the first and main inlet formed by the grating or similar permeable diaphragm 3, which in the example described above is in the form of the gap 8, can possibly also run outside of the rear panel 2 so as to make the front face of such a panel more easily available for the arrangement of shelves, fasteners for tools, etc. Similarly, as mentioned, the expulsion flow previously indicated with AP can develop directly through the rear panel, through an appropriate opening made there.

The present invention has been described with reference to example embodiments thereof. It should be understood that there can be other embodiments based on the same inventive concept, falling within the scope of protection of the claims here attached.

The invention claimed is:

1. A suction wall comprising:
a box-like frame comprising a flat base adapted to rest on the ground;
an inner compartment between a rear panel and a front permeable diaphragm of said frame rising up from said base according to a height direction perpendicular to said base;
suction means in said compartment;
a first inlet of polluted air drawn by the effect of the depression caused by said suction means formed through said permeable diaphragm;
said compartment being further provided with at least one outlet of purified air towards the outside;
filtering means adapted to intercept the airflow between said permeable diaphragm and said outlet,
wherein said filtering means comprises: at least two filtering units arranged in said compartment and intended for polluted air flows having mutually different characteristics;
at least one second inlet of air into said inner compartment coming from catching means at a different height with respect to said first inlet; and
channelling means formed at least partially inside said compartment, adapted to separate the flows coming from said inlets, to convey them towards respective filtering units and make them flow towards said at least one outlet.

2. The wall according to claim 1, wherein said catching means comprise one or more intake mouths arranged below said base.

3. The wall according to claim 1, wherein said catching means comprise one or more intake mouths arranged on a framework along an upper edge of a rear panel of the wall, rising up in a parallel and opposite manner with respect to said permeable diaphragm.

4. The wall according to claim 3, wherein said inner compartment is closed on top by a horizontal first partition parallel to said base, said partition having said at least one outlet formed therein, and defining, together with said rear panel and two flanks, a recess delimited on top by said framework.

5. The wall according to claim 4, wherein said catching means comprise a gap formed between said rear panel and a second partition arranged in said recess, said gap communicating on top with said mouths and at the bottom with said inner compartment through a passage formed in said first partition.

6. The wall according to claim 1, wherein said channelling means comprise two vertical septa that divide said inner compartment into three adjacent and consecutive sectors, said suction means being arranged in a central sector and two filtering units in respective side sectors, said vertical septa comprising passages that place the side sectors in communication with the central sector, the channelling means further comprising shutting means for shutting the first air inlet through said permeable diaphragm at one of the two side sectors with which said catching means are in exclusive communication.

7. The wall according to claim 6, wherein said shutting means comprise a bulkhead spaced from said permeable diaphragm and extending to occupy the central sector and the side sector communicating with the catching means, a space being defined between the grating and the bulkhead, on which the other side sector is open to exert a depression substantially along the entire extension of the permeable diaphragm.

8. The wall according to claim 6, wherein said filtering units are supported by plates that define spaces on top on which said passages of said septa are formed.

9. The wall according to claim 6, wherein said sector communicating with the catching means communicates with the latter through a passage formed near to said base.

10. The wall according to claim 1 comprising, outside of the frame on respective flanks, platforms adapted for the resting of support wheels of an extensible tunnel structure (S) to enclose the work area on the sides and on top.

11. The wall according to claim 10, wherein said tunnel structure comprises a sheet of transparent plastic material for the passage of light and having optical filtering properties suitable for protecting the eyes of passers-by from possible welding sparks, but still making it possible to inspect the work area from outside.

12. The wall according to claim 10, wherein between a flank and the relative platform a chamber is provided, possibly occupied by shelves for housing and storage purposes, for making items transportable together with the wall.

13. The wall according to claim 1, wherein said base, as well as being able to be provided with wheels, has a plate-shaped box-like structure, so as to make passages available for the insertion of lifting forks of fork-lifts.

\* \* \* \* \*